United States Patent
Nelson, Jr. et al.

(10) Patent No.: US 9,661,583 B2
(45) Date of Patent: May 23, 2017

(54) REVERSE LINK INITIAL POWER SETTING USING EFFECTIVE RADIATED POWER MESSAGE TO COMPUTE PATH LOSS

(71) Applicant: IPR LICENSING, INC., Wilmington, DE (US)

(72) Inventors: George R. Nelson, Jr., Merritt Island, FL (US); James A. Proctor, Jr., Indiatlantic, FL (US); John E. Hoffmann, Indialantic, FL (US); Antoine J. Rouphael, Escondido, CA (US)

(73) Assignee: IPR Licensing, Inc., Wilmington, DE (US)

( * ) Notice: Subject to any disclaimer, the term of this patent is extended or adjusted under 35 U.S.C. 154(b) by 19 days.

(21) Appl. No.: 13/963,115

(22) Filed: Aug. 9, 2013

(65) Prior Publication Data

US 2013/0322341 A1    Dec. 5, 2013

Related U.S. Application Data

(63) Continuation of application No. 10/401,115, filed on Mar. 26, 2003, now abandoned, which is a
(Continued)

(51) Int. Cl.
*H04W 52/24* (2009.01)
*H04L 1/16* (2006.01)
(Continued)

(52) U.S. Cl.
CPC ......... *H04W 52/242* (2013.01); *H04L 1/1607* (2013.01); *H04L 12/5602* (2013.01);
(Continued)

(58) Field of Classification Search
CPC ..... H04W 52/50; H04W 52/08; H04W 28/04; H04W 52/24; H04W 52/146
See application file for complete search history.

(56) References Cited

U.S. PATENT DOCUMENTS

| 4,384,363 A | 5/1983 | Lipcon |
| 4,675,863 A | 6/1987 | Paneth et al. |

(Continued)

FOREIGN PATENT DOCUMENTS

| CN | 1182990 | 5/1998 |
| EP | 0 773 636 | 5/1997 |

(Continued)

OTHER PUBLICATIONS

Frank et al., "Random Access Scheme for the ETSI/UTRA WCDMA," IEEE, pp. 1360-1364 (1999).
(Continued)

*Primary Examiner* — Jung Park
(74) *Attorney, Agent, or Firm* — Volpe and Koenig, P.C.

(57) ABSTRACT

In an illustrative embodiment of the present invention, a reference signal including pilot information is transmitted from a base station to one or multiple field units over a pilot channel. A message is also sent to the field units over a paging channel to indicate an effective radiated power level at which the reference signal is transmitted on the pilot channel. Based on a received power level of the reference signal at a field unit and the effective radiated power level of the reference signal, a forward path loss is estimated at the field unit for the forward link between the base station and field unit. Assuming the path loss in the reverse link is approximately the same as the estimated forward link path loss, the field unit can transmit, a reply message in the reverse link so that the base station generally receives a message at-a desired power level.

17 Claims, 9 Drawing Sheets

Related U.S. Application Data continuation of application No. 09/792,870, filed on Feb. 23, 2001, now abandoned.

(60) Provisional application No. 60/184,223, filed on Feb. 23, 2000.

(51) Int. Cl.
| | | |
|---|---|---|
| *H04L 12/54* | (2013.01) | |
| *H04L 12/801* | (2013.01) | |
| *H04L 12/825* | (2013.01) | |
| *H04W 52/50* | (2009.01) | |
| *H04W 74/08* | (2009.01) | |
| *H04W 52/48* | (2009.01) | |
| *H04L 1/00* | (2006.01) | |
| *H04W 24/00* | (2009.01) | |
| *H04W 52/22* | (2009.01) | |

(52) U.S. Cl.
CPC ............. *H04L 47/14* (2013.01); *H04L 47/26* (2013.01); *H04W 52/48* (2013.01); *H04W 52/50* (2013.01); *H04W 74/0825* (2013.01); *H04W 74/0858* (2013.01); H04L 2001/0093 (2013.01); H04W 24/00 (2013.01); H04W 52/228 (2013.01); Y02B 60/50 (2013.01)

(56) References Cited

U.S. PATENT DOCUMENTS

| | | |
|---|---|---|
| 5,056,109 A | 10/1991 | Gilhousen et al. |
| 5,130,983 A | 7/1992 | Heffner, III |
| 5,257,283 A | 10/1993 | Gilhousen et al. |
| 5,267,262 A | 11/1993 | Wheatley, III |
| 5,317,318 A | 5/1994 | Thomas et al. |
| 5,339,316 A | 8/1994 | Diepstraten |
| 5,422,887 A | 6/1995 | Diepstraten et al. |
| 5,491,741 A | 2/1996 | Farwell et al. |
| 5,491,837 A | 2/1996 | Haartsen |
| 5,497,460 A | 3/1996 | Bailey et al. |
| 5,537,414 A | 7/1996 | Takiyasu et al. |
| 5,544,196 A | 8/1996 | Tiedemann et al. |
| 5,559,790 A | 9/1996 | Yano et al. |
| 5,604,730 A | 2/1997 | Tiedemann, Jr. |
| 5,619,530 A | 4/1997 | Cadd et al. |
| 5,647,326 A | 7/1997 | Kato et al. |
| 5,657,326 A | 8/1997 | Burns et al. |
| 5,692,127 A | 11/1997 | Devon |
| 5,740,167 A | 4/1998 | Taketsugu et al. |
| 5,805,994 A | 9/1998 | Perrault et al. |
| 5,859,838 A | 1/1999 | Soliman |
| 5,867,527 A | 2/1999 | Ziv et al. |
| 5,887,245 A | 3/1999 | Lindroth et al. |
| 5,892,774 A | 4/1999 | Zehavi et al. |
| 5,893,035 A * | 4/1999 | Chen .......................... 455/522 |
| 5,933,781 A | 8/1999 | Willenegger et al. |
| 5,946,631 A | 8/1999 | Melnik |
| 5,960,361 A | 9/1999 | Chen |
| 5,978,383 A | 11/1999 | Molle |
| 5,982,760 A | 11/1999 | Chen |
| 5,991,284 A | 11/1999 | Willenegger et al. |
| 6,031,828 A | 2/2000 | Koro et al. |
| 6,035,209 A | 3/2000 | Tiedemann et al. |
| 6,067,458 A | 5/2000 | Chen |
| 6,070,085 A | 5/2000 | Bender et al. |
| 6,075,974 A | 6/2000 | Saints et al. |
| 6,081,536 A | 6/2000 | Gorsuch et al. |
| 6,094,576 A | 7/2000 | Hakkinen et al. |
| 6,097,972 A | 8/2000 | Saints et al. |
| 6,101,179 A | 8/2000 | Soliman |
| 6,118,767 A | 9/2000 | Shen et al. |
| 6,122,269 A | 9/2000 | Wales |
| 6,130,923 A | 10/2000 | Levin et al. |
| 6,138,033 A | 10/2000 | Kitade et al. |
| 6,151,332 A | 11/2000 | Gorsuch et al. |
| 6,157,616 A | 12/2000 | Whitehead |
| 6,173,188 B1 | 1/2001 | Kim |
| 6,185,432 B1 | 2/2001 | Vembu |
| 6,188,678 B1 | 2/2001 | Prescott |
| 6,192,249 B1 | 2/2001 | Padovani |
| 6,201,827 B1 | 3/2001 | Levin et al. |
| 6,201,954 B1 | 3/2001 | Soliman |
| 6,222,832 B1 | 4/2001 | Proctor |
| 6,229,841 B1 | 5/2001 | Levin et al. |
| 6,236,647 B1 | 5/2001 | Amalfitano |
| 6,240,071 B1 | 5/2001 | Willenegger et al. |
| 6,249,683 B1 | 6/2001 | Lundby et al. |
| 6,252,865 B1 | 6/2001 | Walton et al. |
| 6,252,915 B1 | 6/2001 | Mollenkopf et al. |
| RE37,301 E | 7/2001 | Lo |
| 6,256,301 B1 | 7/2001 | Tiedemann, Jr. et al. |
| 6,259,928 B1 | 7/2001 | Vembu |
| 6,269,088 B1 | 7/2001 | Masui et al. |
| 6,272,354 B1 | 8/2001 | Saaroi |
| 6,275,478 B1 | 8/2001 | Tiedemann, Jr. |
| 6,421,325 B1 | 7/2002 | Kikinis |
| 6,539,233 B1 | 3/2003 | Taketsugu |
| 6,545,994 B2 | 4/2003 | Nelson et al. |
| 6,674,765 B1 * | 1/2004 | Chuah ............... H04W 74/0875 370/252 |
| 6,775,548 B1 | 8/2004 | Rong et al. |
| 6,782,035 B1 | 8/2004 | Nakamura et al. |
| 6,850,504 B1 | 2/2005 | Cao et al. |
| 6,904,079 B2 | 6/2005 | Hoffmann et al. |
| 6,967,936 B1 | 11/2005 | Laroia et al. |
| 6,985,511 B2 * | 1/2006 | Kanterakis et al. .......... 375/141 |
| 6,985,728 B2 | 1/2006 | Tiedemann et al. |
| 7,079,507 B2 | 7/2006 | Toskala et al. |
| 7,079,523 B2 | 7/2006 | Nelson et al. |
| 7,480,275 B2 | 1/2009 | Moon et al. |
| 8,175,120 B2 | 5/2012 | Nelson, Jr. et al. |
| 2002/0075891 A1 | 6/2002 | Souissi |
| 2003/0026283 A1 | 2/2003 | Currivan et al. |
| 2005/0058151 A1 | 3/2005 | Yeh |

FOREIGN PATENT DOCUMENTS

| | | |
|---|---|---|
| EP | 0 910 176 | 4/1999 |
| EP | 0 978 958 | 2/2000 |
| EP | 1 018 809 | 12/2000 |
| EP | 1 126 737 | 8/2001 |
| JP | 08-070274 | 3/1996 |
| JP | 10-013338 | 1/1998 |
| JP | 10-075210 | 3/1998 |
| JP | 10-079776 | 3/1998 |
| JP | 10-210530 | 8/1998 |
| JP | 11-075249 | 3/1999 |
| JP | 11-284568 | 10/1999 |
| KR | 100205047 | 3/1999 |
| KR | 2000-0008081 | 2/2000 |
| WO | 9614716 A1 | 5/1996 |
| WO | 97/46041 | 4/1997 |
| WO | 98/18280 | 4/1998 |
| WO | 99/14869 | 3/1999 |
| WO | 99/21375 | 4/1999 |
| WO | 9949597 A1 | 9/1999 |

OTHER PUBLICATIONS

Mollenauer et al., "MAC Proposal for IEEE 802.16.1," IEEE 802.16 Broadband Wireless Access Working Group, (Dec. 24, 1999).

TIA/EIA Interim Standard, "Mobile Station-Base Station Compatibility Standard for Dual-Mode Wideband Spread Spectrum Cellular System," TIA/EIA/IS-95-A (May 1995).

Yang, "Principles of Code Division Multiple Access," In CDMA RF System Engineering, (MA: Artech House, Inc.) Chapter 4, pp. 75-103 (1998).

Siemens, Editorial changes to 25.402, 3GPP TSG-RAN-WG3 meeting #10, R3-000213, Gothenburg, Sweden, Jan. 24-28, 2000.

(56) References Cited

OTHER PUBLICATIONS

Siemens, Editorial modifications to 25.402, 3GPP TSG-RAN Working Group 3, Meeting #10, R3-000213, Gothenburg, Sweden, Jan. 24-28, 2000.
ANSI/IEEE Std 802.11,1999 Edition, Information technology—Telecommunications and information exchange between systems—Local and metropolitan area networks—Specific requirements—Part 11: Wireless LAN Medium Access Control (MAC) and Physical Layer (PHY) Specifications, (Mar. 18, 1999).
Telecommunications Industry Association, "TIA/EIA Standard, Mobile Station-Base Station Compatibility Standard for Wideband Spread Spectrum Cellular Systems, TIA/EIA-95B (Upgrade and Revision of TIA/EIA-95A)," (Mar. 1999).
Third Generation Partnership Project, "Technical Specification Group Radio Access Network; MAC protocol specification (3G TS 25.321 version 3.2.0)," 3G TS 25.321 V3.2.0 (Dec. 1999).
Third Generation Partnership Project, "Technical Specification Group Radio Access Network; MAC protocol specification (Release 1999)," 3GPP TS 25.321 V3.6.0 (Dec. 2000).

* cited by examiner

REVERSE LINK INITIAL POWER SETTING USING EFFECTIVE RADIATED POWER MESSAGE TO COMPUTE PATH LOSS

CROSS REFERENCE TO RELATED APPLICATIONS

This application is a continuation of U.S. patent application Ser. No. 10/401,115 filed Mar. 26, 2003, which is a continuation application of U.S. application Ser. No. 09/792,870 filed on Feb. 23, 2001 which claims the benefit of U.S. Provisional Application Ser. No. 60/184,223 filed on Feb. 23, 2000, the contents of which are hereby incorporated by reference herein.

BACKGROUND

A specific protocol has been developed for allowing multiple users to transmit over a shared radio channel. For example, the IEEE (Institute of Electrical and Electronics Engineers) 802.11 Standard generally supports access to radio channels based on a method known as Carrier Sense Multiple Access with Collision Avoidance (CSMA/CA).

In simple terms, this method is based on a "listen before talk" scheme. A transmitter device monitors traffic on a shared radio channel to determine if another transmitter device is presently transmitting on the same channel. If the radio channel is in use, the transmitter device will continue to monitor the channel until it is clear. When the radio channel is finally clear, the transmitter will then transmit over the radio channel.

Ideally, another transmitter device will not simultaneously transmit during the same time. However, a collision can occur on the radio channel when two or more transmitter devices transmit on the radio channel simultaneously. Consequently, neither message transmission would be intelligible and both transmitter devices must re-transmit their messages again to a corresponding target device.

Based on this CSMA/CA scheme, re-transmission of data due to a collision cannot occur before a minimum time gap. After the minimum time gap has passed, the transmitter device selects a random "backoff interval," which is the wait time before the radio channel is again monitored to determine whether the radio channel is clear to transmit. If the channel is still busy, another shorter "backoff interval," is selected for a subsequent message transmission. This process is repeated until the transmitter device is able to transmit data.

Another standard for transmitting data on a shared radio channel is based on IS-95, in which multiple field units can transmit at the same time.

The IS-95 standard suggests a method of ramping RF power of a field unit until a message from the field unit is transmitted at a power level that is detectable at a base station. According to this method, a field unit transmits an access request message to a base station for the assignment of wireless resources on a reverse link.

After transmitting an access request message on an access channel, the field unit monitors a paging channel for an acknowledgment message from the base station indicating that the access request message was properly received. If no acknowledgment message is sent to the requesting field unit, it is presumed that the message from the field unit was not transmitted at an appropriate power level. That is, the power output level of the field unit is so low that the base station did not detect a previously transmitted access request message. The access request message is then re-transmitted over the access channel at a higher power level.

This process is subsequently repeated until the field unit transmits a message at a power level that is high enough for the base station to properly receive the message. Similar to the IEEE 802.11 standard, a collision can occur on the shared radio channel when two or more field units simultaneously transmit a message.

SUMMARY

The present invention is generally directed towards an apparatus and method for enhancing the utilization of resources in a wireless communication system. In an illustrative embodiment, a reference signal is transmitted from a first transceiver to a second transceiver or group of target transceivers. The first transceiver also transmits a first message, which includes information indicating an effective radiated power level at which the first transceiver transmits the reference signal. The received power level of the reference signal is then measured at the second transceiver to estimate a path loss between the first transceiver and second transceiver. More specifically, a path loss can be calculated by comparing the received power level of the reference signal with the effective radiated power level information as indicated by the first message.

A second message is optionally sent from the first transceiver to the second transceiver. This second message can include information indicating a desired power level at which subsequent messages in a reverse direction should be received at the first transceiver.

In certain applications, the forward path loss between the first transceiver and second transceiver is approximately the same as a reverse path loss for message transmissions from the second transceiver back to the first transceiver. Consequently, the second transceiver can adjust its power output level so that the first transceiver receives a message at the desired power level taking into account the estimated path loss as previously discussed. Of course, the path loss can be different in the reverse link direction than that of the forward link and an estimated power setting at which the second transceiver transmits a message can be a starting point for transmitting subsequent messages. For example, the power output level of the second transceiver can be increased for subsequent message transmissions until the first transceiver detects the message.

In a specific application of the present invention, the reference signal is transmitted over a pilot channel of a CDMA (Code Division Multiple Access) communication system. The reference signal itself optionally includes a marker such as pilot symbols that are monitored at a second transceiver. The first message as transmitted by the first transceiver can be transmitted over a paging channel, while a reply message from the second transceiver to the first transceiver can be transmitted over an access channel in which multiple transceivers compete to transmit messages to the first transceiver. The access channel is optionally divided into time slots in which a transceiver sends a message to the first transceiver.

One message type that can be transmitted on the access channel is an access request message. Such a message is an indication to the first transceiver that a more formal communication link should be established between the first transceiver and second transceiver. Consequently, the more formal communication link can be allocated to support more efficient, on-demand data transfers.

An access request message is optionally encoded so that it includes timing alignment information. For example, the first transceiver can analyze a reply message such as an access request message including a timing marker and provide feedback indicating whether the reply is appropriately transmitted within a time slot. Other types of reply messages can also include a reference marker for timing alignment. In one application, a reference marker is a string including pilot information such as one or multiple pilot symbols.

In addition to monitoring the timing of a reply message, the received power level of a reply message can be monitored to determine whether a transceiver is transmitting a message so that it is received at a desired power level. This can be achieved by comparing a power level at which a reply message is received to a desired power level at which the reply message should be received. Based on this comparison, a power adjustment message is optionally transmitted to a corresponding target transceiver. Thus, subsequent message transmissions from a second transceiver to the first transceiver can be optimally adjusted based on. operating conditions of the wireless communication system at an instant in time.

Certain aspects of the present invention reduce co-channel interference and generally increase the throughput capability of a wireless communication system. As previously discussed, an initial power output level of a field unit can be adjusted so that it minimally interferes with others when it initially transmits messages or transmits subsequent messages. When message transmissions on an allocated channel such as an access channel are minimized, more wireless resources can otherwise be allocated for supporting higher speed data transfers in a wireless communication system.

Of course, the initial power output level of a field unit can be so low that a message transmission is not detected at a target device such as a base station. In this case, a power output level can be increased accordingly for subsequent message transmissions until the message is detected at a target transceiver. This process of incrementally increasing the power level can be a time consuming process, especially if the power output of the transceiver were to start transmitting at a lowest possible power level. Thus, it can take a considerable amount of time to successfully transmit a message to a target receiver such as a base station.

The principles of the present invention can be used to simultaneously reduce the effective time it takes to transmit a message to a base station while minimally interfering with other channels of the wireless communication system. This is achieved, at least in part, by approximating a path loss between a field unit and base station and transmitting a message from the field unit so that a message is received at a desired power level at the base station. Since the initial power setting of the field unit is approximately set to a detectable power level for data transmissions to a target receiver, it typically requires less time to transmit an initial message to a target receiver when power is incrementally increased so that a message is eventually detected.

Figure 1:
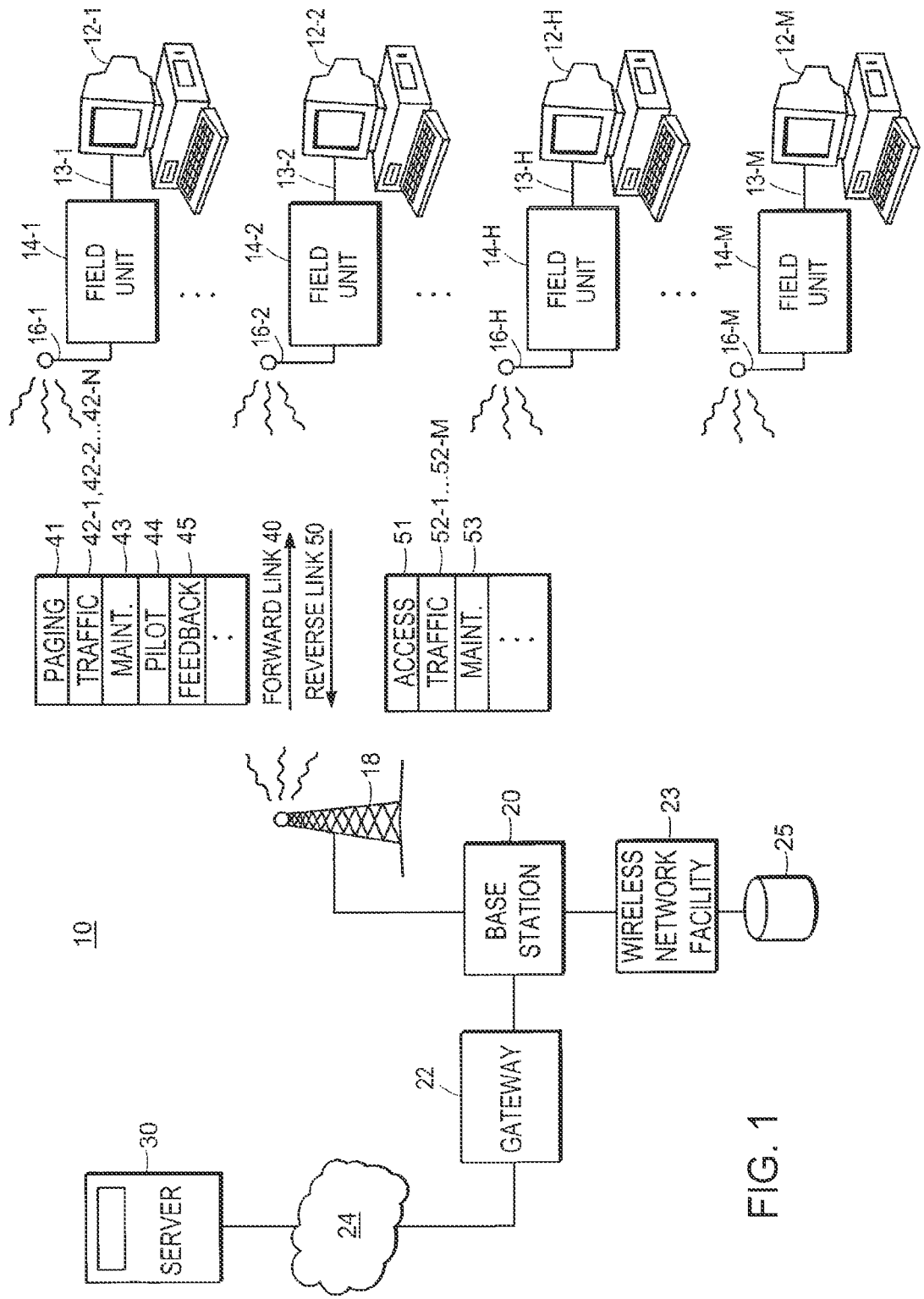
FIG. 1 is a bock diagram of an illustrative wireless communication system according to certain principles of the present invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A description of preferred embodiments of the invention follows.

FIG. 1 is a block diagram illustrating a wireless communication system supporting the transmission of data information over multiple allocated communication channels according to certain aspects of the present invention. As in many wireless communication systems, users compete for wireless bandwidth allocation. Hence, it is desirable that the wireless communication 10 is optimized for data throughput and, in certain applications, hi-speed bursts of data throughput.

Certain aspects of the present invention are based on the recognition that the power output of a field unit transmitting over a wireless channel can be controlled so that it minimally interferes with other field units using the same general wireless airspace. In particular, a power output level of a newly transmitting field unit is initially set so low that a base station may not detect messages transmitted by the field unit. This initially low power setting of a field unit reduces co-channel interference because the transmitter device is not transmitting at excessive power levels. During subsequent communication attempts with the base station, the power output of a field unit is then ramped up until messages are acknowledged at the base station.

In one application, one or multiple field units randomly transmit messages on a first allocated channel. When two field units transmit a message simultaneously on this first allocated channel, there can be a message collision at the base station. The base station may be able to detect that a message was transmitted by a field unit and there was a message collision. However, the base station may not be able to decipher the contents of the message and determine from which field unit transmitted a message. Thus, in certain situations, the base station can not transmit a message directed specifically to a particular field unit indicating that a collision occurred for a previous message transmission.

One aspect of the present invention involves providing general feedback information to the field units indicating that a collision was detected. Consequently, a previous undetected message can be re-transmitted by a field unit. If there was no collision detected and no acknowledgment received by the filed unit, the field unit can successively ramp up its power output setting for subsequent message transmission attempts to ensure that a message will eventually be acknowledged by the base station.

According to the following description of a preferred embodiment, communication system 10 is described as a wireless communication link such as a CDMA radio channel utilizing shared channel resources. However, it should be noted that the techniques described herein can be applied in other applications supporting shared access. For example, the principles of the present invention can be applied to other general applications such as telephone connections, computer network connections, cable connections, or other physical media to which allocation of resources such as data channels are granted on an as-needed basis.

As shown, communication system 10 includes a number of Personal Computer (PC) devices 12-1, 12-2, . . . 12-h, . . . 12-m, corresponding field units or terminals 14-1, 14-2, . . . 14-h, . . . 14-m, and associated directional antenna devices 16-1, 16-2, . . . 16-h, 16-m. Centrally located equipment includes a base station antenna 18, and a corresponding base station 20 that includes high speed processing capability.

Base station 20 and related infrastructure provides connections to and from a network gateway 22, network 24 such as the Internet, and network file server 30. Communication system 10 is preferably a demand access, point to multi-point wireless communication system such that the PC devices 12 can transmit data to and receive data from network server 30 based on a logical connection including bi-directional wireless connections implemented over forward links 40 and reverse links 50. That is, in the point to multi-point multiple access wireless communication system 10 as shown, a given base station 20 typically supports communication with a number of different field units 14 in a manner which is similar to a cellular telephone communication network. Accordingly, system 10 can provide a framework for a CDMA wireless communication system where digital information is relayed on-demand between multiple mobile cellular users and a hardwired network 24 such as the Internet.

PC devices 12 are typically laptop computers, handheld units, Internet-enabled cellular telephones, Personal Digital Assistant (PDA)-type computers, digital processors or other end user devices, although almost any type of processing device can be used in place of PC devices 12. One or multiple PC devices 12 are each connected to a respective subscriber unit 14 through a suitable hard wired connection such as an Ethernet-type connection via cable 13.

Each field unit 14 permits its associated PC device 12 access to network file server 30. In the reverse link 50 direction, that is, for data traffic transmitted from the PC 12 towards the server 30, the PC device 12 transmits information to field unit 14 based on, for example, an Internet Protocol (IP) level network packets. The field unit 14 then encapsulates the wired framing, i.e., Ethernet framing, with appropriate wireless connection framing so that data packets can be transmitted over the wireless link of communication system 10. Based on a selected wireless protocol, the appropriately formatted wireless data packet then travels over one of the radio channels that comprise the reverse link 50 through field unit antenna 16 to base station antenna 18. At the central base station location, the base station 20 then extracts the radio link framed data packets and reformats the packets into an IP format. The packets are then routed through gateway 22 and any number or type of networks 24 to an ultimate destination, such as a network file server 30.

In one application, information generated by PC device 12 is based on a TCP/IP protocol. Consequently, a PC device 12 has access to digital information such as web pages available on the Internet. It should be noted that other types of digital information can be transmitted over channels of communication system 10 based on the principles of the present invention.

Data information, can also be transferred from the network file server 30 to PCs 12 on forward link 40. In this instance, network data such as IP (Internet Protocol) packets originating at file server 30 travel, on network 24 through gateway 22 to eventually arrive at base station 20. As previously discussed for reverse link data transmissions, appropriate wireless protocol. framing is then added to raw data such as IP packets for communication of the packets over wireless forward link 40. The newly framed packets then travel via an RF signal through base station antenna 18 and field unit antenna 16 to the intended target field unit 14. An appropriate target field unit 14 decodes the wireless packet protocol layer, and forwards the packet or data packets to the intended PC device 12 that performs further processing such as IP layer processing.

A given PC device 12 and file server 30 can therefore be viewed as the end points of a logical connection at the IP level. Once a connection is established, between the base station processor 20 and corresponding field unit 14, a user at the PC device 12 can then transmit data to and receive data from file server 30 on an as-needed basis.

Reverse link 50 optionally includes different types of logical and/or physical radio channels such as an access channel 51, multiple traffic channels 52-1, . . . 52-m, and a maintenance channel 53. The reverse link access channel 51 is typically used by the subscriber units 14 to request an allocation of traffic channels by the base station 20. For example, traffic channels 52 can be assigned to users on an as-needed basis. The assigned traffic channels 52 in the reverse link 50 then carry payload data from field unit 14 to base station 20.

Notably, a given link between base station 20 and field unit 14 can have more than one traffic channel 52 assigned to it at a given instant in time. This enables the transfer of information at higher rates.

Maintenance channel 53 can be used to carry maintenance information such as synchronization and power control messages to further support transmission of digital information over both reverse link 50 and forward link 40.

Forward link 40 can include a paging channel 41, which is used by base station 20 to inform a field unit 14 of general information such as that one or multiple forward link traffic channels 42 have been allocated to it for forward link data transmissions. Traffic channels 42-1 . . . 42-n on the forward link 40 are used to carry payload information from base station 20 to a corresponding target subscriber unit 14.

Maintenance channel 43 can be used to transmit synchronization and power control information on forward link 40 from base station processor 20 to field units 14. Additionally, paging channel 41 can be used to inform a field unit 14 of allocated traffic channels 52 in the reverse link 50 direction.

Traffic channels 42 of the forward link 40 can be shared among multiple subscriber units 14 based on a Time Division Multiplexing scheme. Specifically, a forward link traffic, channel 42 is optionally partitioned into a predetermined number of periodically repeating time slots for transmission of data packets from the base station 20 to multiple subscriber units 14. It should be understood that a given subscriber unit 14 can, at any instant in time, have multiple time slots or no time slots assigned to it for use. In certain applications, an entire time-slotted forward or reverse link traffic channel can also be assigned for use by a particular field unit 14 on a continuous basis.

Figure 2:
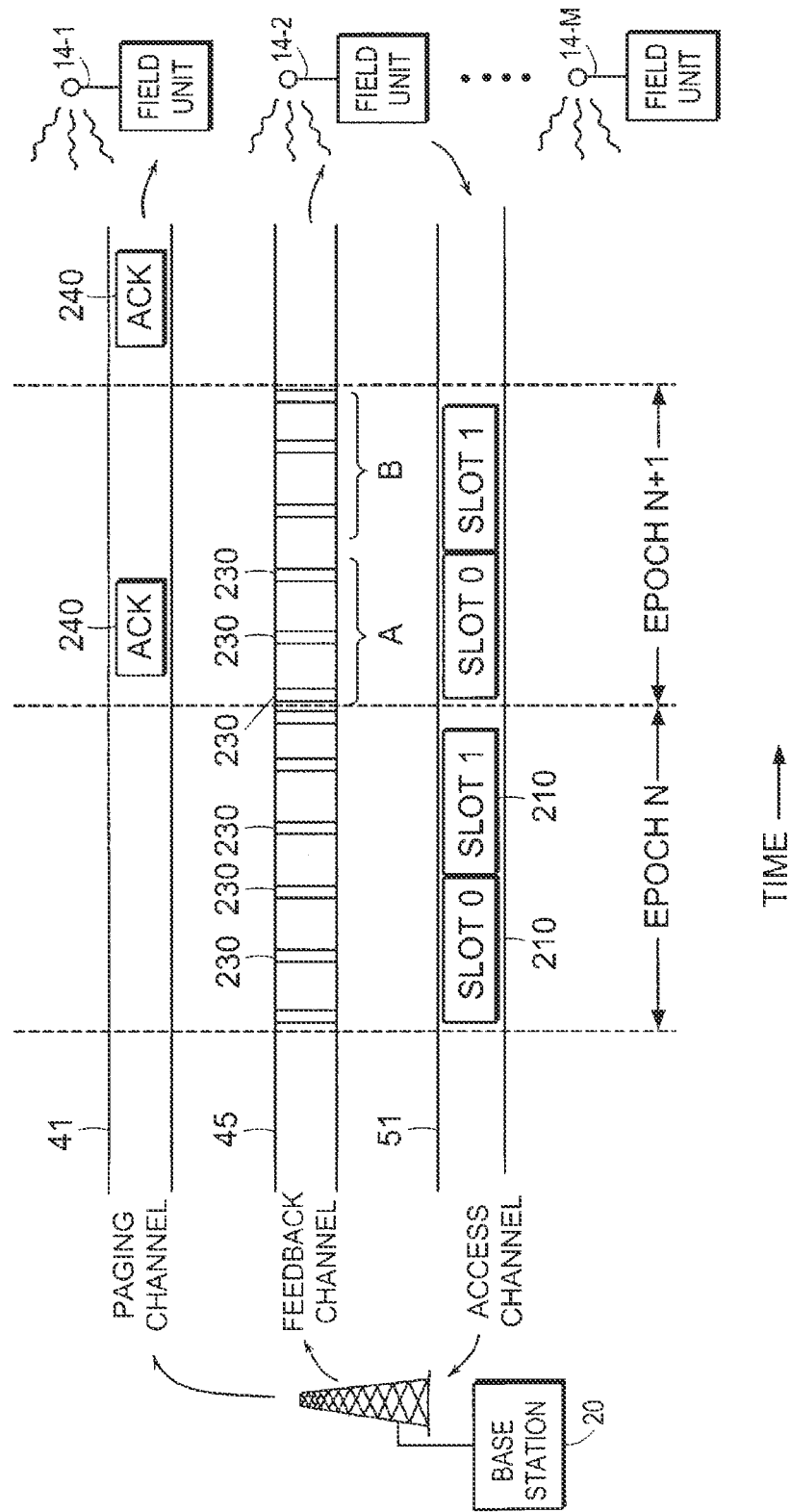
FIG. 2 is a timing diagram illustrating multiple channels on which messages are transmitted according to certain principles of the present invention.

FIG. 2 is a timing diagram illustrating multiple channels on which messages are transmitted between a base station 20 and field units 14 according to certain principles of the present invention. As shown, field units 14 can transmit messages to base station 20 over a dedicated channel such as access channel 51. Access channel 51 supports a transmission of access request messages from a field unit 14 to base station 20. An access request message can indicate a request by field unit 14 for a high speed bi-directional communication link.

Message transmissions over access channel 51 need not be limited to access request type messages. For example, access channel 51 can be structured to support other types of messages.

In the illustrative timing diagram as shown in FIG. 2, access channel 51 is optionally partitioned into periodically repeating time slots 210 in which messages are transmitted from a field unit 14 to base station 20. More specifically, an Epoch on the order of 26.6 mS in duration can be partitioned to include time slot #0 and time slot #1 as shown. In this application, a field unit or multiple field units 14 can randomly send messages to base station 20 in either time slot of an Epoch. Providing multiple time slots 210 in which a field unit 20 can transmit a message renders it less likely that two randomly transmitting field units 14 will transmit a message in a same time slot 210. Depending on an application, a field unit 14 can be synchronized with base station 20 using pilot channel 44 so that messages can be transmitted in a particular time slot 210.

When a collision occurs, i.e., two field units 14 transmit a message in the same time slot 210, a device monitoring access channel 51 for such messages may not be able to properly decode or decipher the content of either transmitted message. An indication of this condition is transmitted to field units 14.

Feedback channel 45 is provided so that base station 20 can send feedback messages 230 to field units 14. At least a portion of the feedback channel 45 as shown is reserved for transmitting general messages to the collective field units 14 whether or not a message collision occurred on access channel 51 in a previous Epoch and, more particularly, that a message occurred in a particular time slot 210.

A feedback message 230 is optionally a sequence of encoded information or single bit indicating whether a collision occurred for a message transmitted to base station 20 in a time slot 210. As shown, multiple feedback messages 230 can be generated during a given time duration such as an Epoch or half Epoch. For example, feedback information such as feedback messages 230 can be transmitted in duration A of Epoch N+1 to indicate that a collision occurred for the reception of a message 210 in time slot #0 of Epoch N at base station 20. More specifically, a logic 1 transmitted in each of three feedback messages 230 of duration A can indicate that a collision was detected while a logic 0 setting can indicate that no collision was detected.

Transmitting multiple, spaced feedback messages 230 as shown for duration A provides redundancy to some extent. For example, multiple messages 230 transmitted in a given duration, such as duration A, can be part of a redundantly transmitted message to increase the chance that a field unit 14 will be properly notified whether a collision occurs. Hopefully, at least one of the multiple feedback messages 230 can be identified at a field unit 14 even if a message transmission failure occurs for some of the messages 230 in, for example, duration A.

In a similar manner as previously discussed, feedback messages 230 of feedback channel 45 transmitted in duration B of Epoch N+1 can indicate whether a message collision is detected in time slot #1 of Epoch N as monitored by base station 20.

In a reverse link direction, a message transmitted by a field unit 14 to base station 20 on access channel 51 includes unique information such as the identification number of the field unit 14 transmitting the message. In forward link direction, paging channel 41 supports message transmissions from base station 20 to field units 14, where the message transmissions are typically directed to a specific field unit 14. Thus, base station 20 can respond to a field unit 14 that sent a message on access channel 51 by transmitting a reply message to the field unit 14 over paging channel 41. Other link information forwarded on the paging channel 41 can be forwarded to a field unit 14 to establish a formal bi-directional link between base station 20 and field unit 14.

One type of message transmitted on paging channel 41 is an ACK (acknowledgment) message 240. ACK messages 240 are sent by base station 20 to indicate that a message received in a time slot 210 of access channel 51 was properly received. Similar to the feedback messages 230 on feedback channel 45, ACK messages transmitted to a field unit 14 are also feedback messages. However, an ACK message 240 indicates that a previous access request message transmitted by a field unit 14 was properly received. ACK message 240 can also indicate that a formal communication link will be established with the access requesting field unit 14. For instance, traffic channels can be assigned to field unit 14 for transmitting or receiving a data payload.

It should be noted that field units 14 optionally transmit at such a low power output level that messages transmitted in a particular time slot 210 are not detected at base station 20. In this instance, a field unit 14 can adjust its power output level for a subsequent message transmission based on feedback information received from base station 20. More specifically, a field unit 14 can adjust its power output level depending on a feedback message 230 or ACK message 240 received on feedback channel 45 or paging channel 41 respectively. Accordingly, the power output level of a field unit 14 can be optimized so that it minimally interferes with other field units 14 transmitting information over a common radio frequency.

Although other message types can be supported, the messages transmitted in a time slot 210 of access channel 51 are typically access request messages indicating that a field unit 14 would like to receive or transmit data payload information on reverse link traffic channels 52 or forward traffic channels 42.

One aspect of adjusting the power output of a field unit 14 is to determine whether or not a collision was detected for a previous message transmission from the field unit 14 to base station 20. For example, if a collision is not detected for a previously transmitted message from a particular field unit 14, the power output level for a subsequent message transmission from the field unit 14, if any, can be increased so that base station 20 is more likely to detect the message transmission. More specifically, the power output level of a field unit 14 can be increased a predetermined amount such as +0.5 dB for a subsequent message transmission if no collision was detected for a previous message transmission.

In the event that a message transmission by a field unit 14 does result in a collision due to multiple field units 14 transmitting in a same time slot 210, the power output level of the field unit 14 can be unchanged or potentially reduced for a subsequent message transmission since it is not known whether the message transmission by a field unit 14 would have otherwise been detected at base station 20 if only one field unit 14 transmitted a message within a particular time slot 210. Hence, one aspect of the present invention involves adjusting the power output level of a field unit 14 so that it minimally interferes with others using the same radio channel.

This method of transmitting messages can be particularly useful when a user first powers a field unit 14 and must communicate with base station 20. For example, it is undesirable in certain situations to transmit a message at such a high power output level that such message transmissions cause other data transmissions on the radio channel to become corrupted due to excessive noise.

In a similar manner as previously discussed, the power output level of a field unit 14 can be adjusted depending on whether base station 20 acknowledges receipt of a message on access channel 51. Thus, if field unit 14 does not detect a reply ACK message 240, the power output level of field unit 14 can be increased for subsequent message transmissions.

A maximum power adjustment level such as 60 dBm can be selected in which the field unit 14 will discontinue transmitting if no ACK message is received even at this level.

A more sophisticated application of the present invention can involve adjusting a power output level of a field unit 14 depending on both a feedback message 230 indicating whether a collision was detected and an ACK message 240 indicating that an access message was acknowledged by base station 20. More specifically, a field unit 14 can adjust its power output level for subsequent message transmissions if no collision is detected and no ACK message is received for a previously transmitted message from a field unit 14. Otherwise, the field unit 14 can re-transmit at a previous power output level.

Regardless of which method is used to adjust the power output level, the power level setting at which base station 20 acknowledges receipt of a message from a field unit 14 can be used to determine power level settings at which the field unit 14 must transmit other information to base station 20. For example, a message from a field unit 14 can be transmitted using a particular modulation rate during the initial message transmission. The power output level of subsequent transmissions from the field unit 14 can be adjusted to accommodate transmitting messages at different modulation rates. For example, it can be determined at what power level a field unit should transmit on allocated traffic channels using a different modulation rate. A history of the power level output adjustments are optionally maintained to track power adjustments and determine at what power level a monitoring device such as base station 20 detects the transmission of a message.

As previously discussed, one aspect of the present invention involves re-transmitting a message from a field unit 14 so that it can be detected at base station 20. A re-transmission is optionally based on a random back off time so that a collision is less likely to occur on a subsequent attempt to transmit a message.

Consider a situation where two or more field units 14 transmit a message over access channel 51 and a collision is detected at base station 20. As previously discussed, a feedback message will be transmitted to the field units 14 indicating that a collision occurred. Both field units 14 must then re-transmit their corresponding messages to base station 20.

To avoid another collision, the field units 14 randomly choose a back off time relative to the previous message transmission in which the collision occurred and transmit in another time slot 210. For example, if field unit A and field unit B transmit a message in time slot #0 of Epoch N, field unit A will choose a back off time such as 3 Epochs and re-transmit a message to base station 20 in time slot #1 of Epoch N+3 while field unit B re-transmits a message based on a random back off time in time slot #0 of Epoch N+2. Accordingly, field units A and B are less likely to cause another collision for a message re-transmission.

Figure 3:
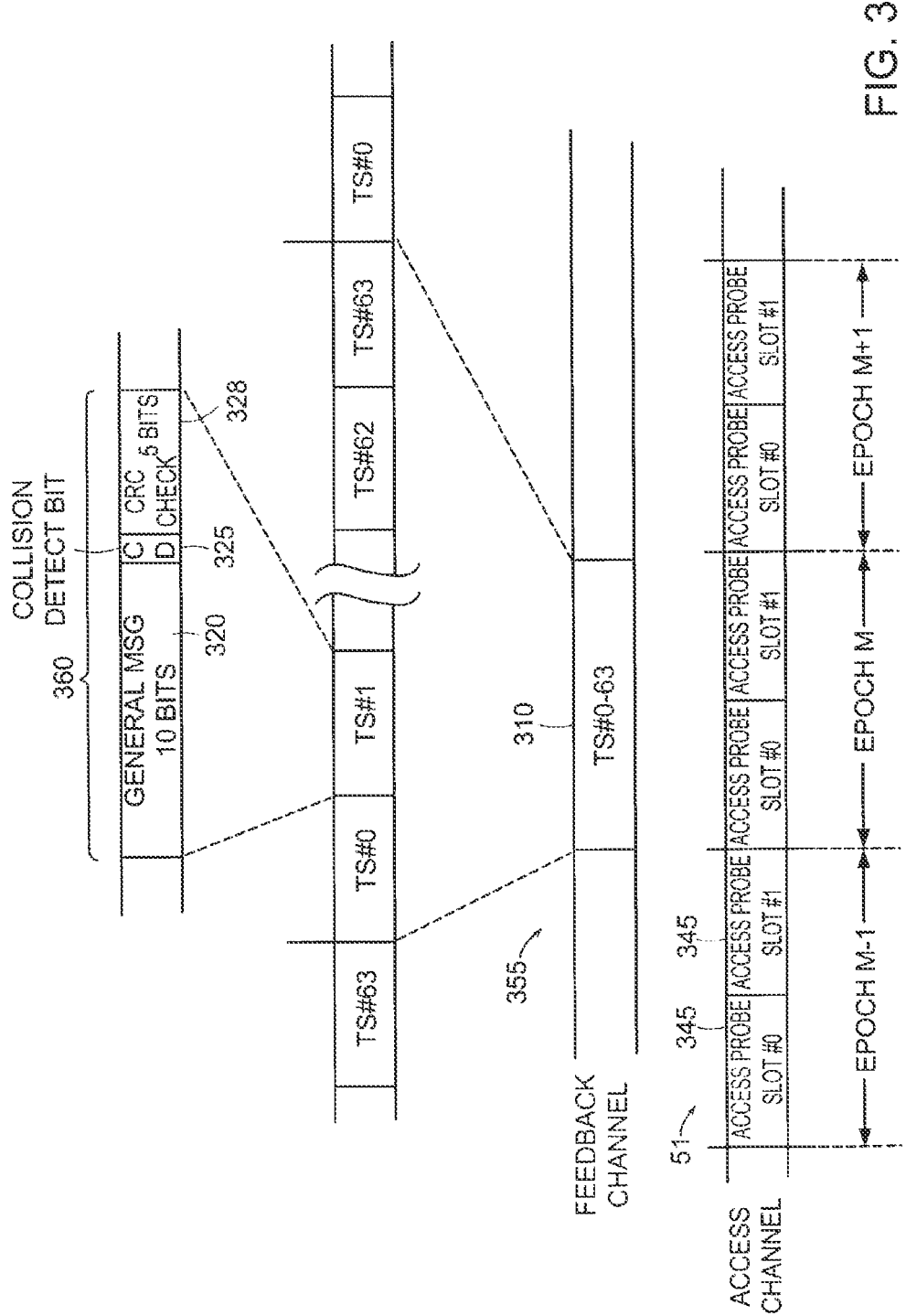
FIG. 3 is a timing diagram illustrating a use of data fields within a time-slotted channel according to certain principles of the present invention.

FIG. 3 is a timing diagram illustrating another embodiment of the present invention for transmitting feedback messages to field units 14. An access channel 51 is partitioned so that a field unit 14 can transmit an access probe or other message in a time slot 345. As shown, feedback channel 355 is partitioned to include 64 time slots TS#0, TS#1, TS#2 . . . TS#63 that repeat every Epoch.

Each time slot 315 of feedback channel 355 preferably includes a data field supporting 16 bits of information. In the specific application as shown, ten bits of information are reserved for a general message, one bit is reserved as a collision detect bit 325 and five bits are reserved for CRC (Cyclical Redundancy Check) data 328. General message 320 is optionally a message directed to a particular field unit 14. For example, each of multiple field units 14 can be assigned use of a particular time slot 315 for receiving feedback information from base station 20 to field units 14. When assigned, a corresponding field unit 14 monitors an appropriate time slot 315 to receive messages from base station 20. One type of specific message in a time slot 315 is feedback information to a field unit 14 indicating how its timing or power should be adjusted so that messages transmitted from a field unit 14 are properly received at base station 20.

Time slots 315 are optionally unassigned and the message itself can include an address to which field unit 14 a message is directed. Thus, in a modified embodiment, feedback messages can be transmitted asynchronously to a field unit 14.

Collision, detect bit 325 in a time slot 315 is a single bit indicating whether a collision occurred in a monitored time slot 345. More specifically, collision detect bits 325 of time slot TS#0, TS#1 . . . TS#31. of Epoch M can be used to indicate that a collision occurred in access probe slot #0 of Epoch M-1. Accordingly, this string of individual collision detect bits 328 over multiple time slots can be set to a same logic state indicating that a collision was detected.

In a similar manner, TS#32, TS#33 . . . TS#63 of Epoch M can be set appropriately to indicate whether a collision occurred on access probe slot #1 of Epoch M-1. Thus, a monitoring field unit 14 can determine whether a collision occurred at base station 20 based on a single bit, a sequence of multiple bits, or a sequence of spaced bits.

CRC data 328 is also provided in a feedback message 360. The CRC data 328 is optionally decoded at the field unit 14 to ensure that a message 360 is properly received at a field unit 14 and, more specifically, that a particular collision detect bit 325 is properly received. Other methods can also be used to ensure and verify that a message and data is properly received at field unit 14. For example, a message can be transmitted based on an FEC (Forward Error Correction) code.

Figure 4:
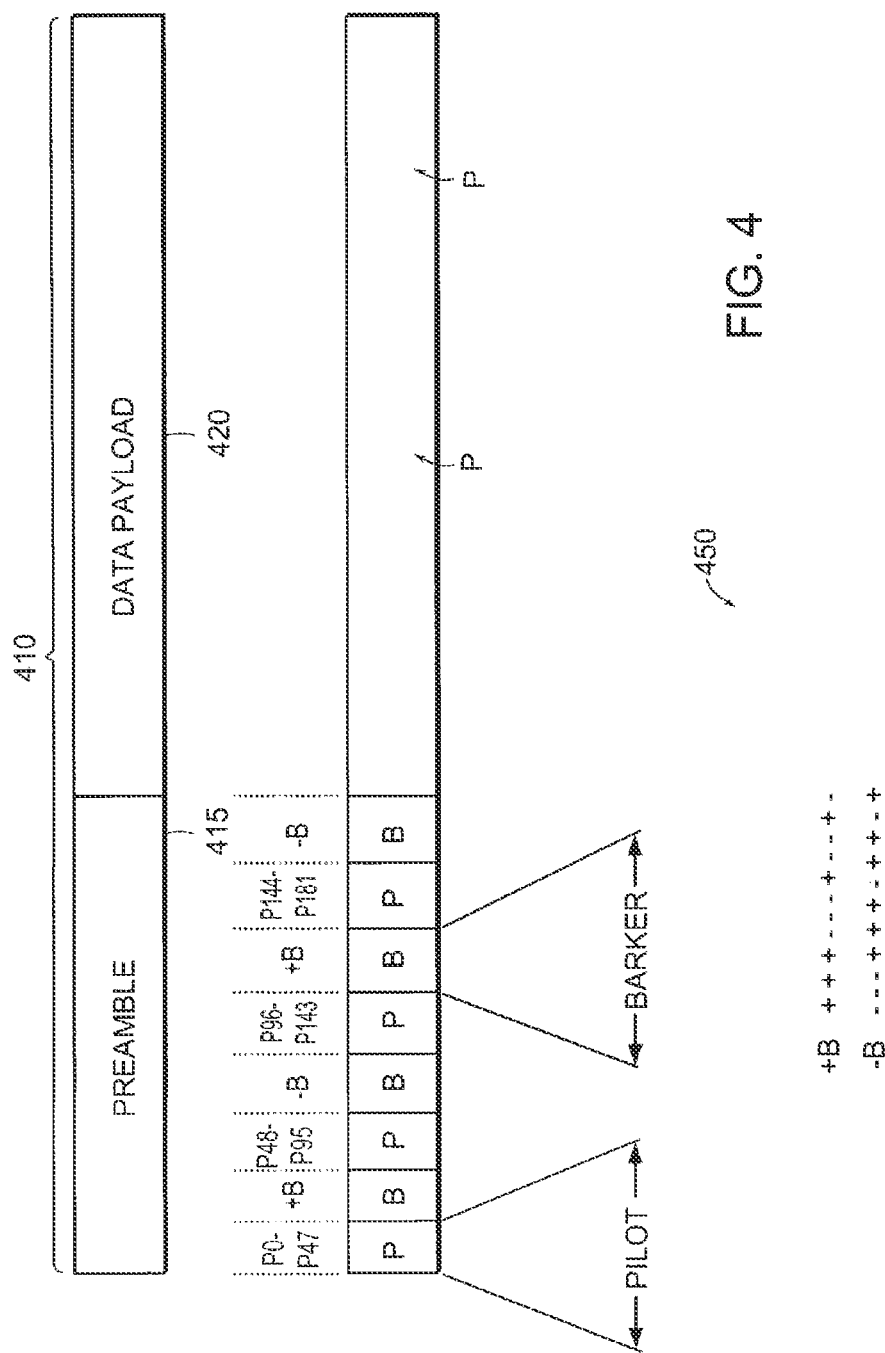
FIG. 4 is a pictorial diagram illustrating details of a message according to certain principles of the present invention.

FIG. 4 is a diagram illustrating a format for transmitting messages over the access channel from a field unit to a target receiver according to the principles of the present invention.

In one application, message 410 is transmitted by a field unit 14 over access channel 51 and includes two parts. As shown, a first part or preamble 415 of message 410 is a coded message indicating a request by the field unit 14 for a communication link. Each field unit 14 can transmit a message 410 having a commonly coded preamble 415. Thus, if two field units 14 transmit a message including the same preamble message 415, base station 20 can determine that at least a preamble message 415 was sent by at least one field unit 14. That is, the preamble message 415 as transmitted by one field unit can overlap with the preamble message 415 as transmitted by another field unit 14 when multiple messages 410 are transmitted in the same time slot.

Message 410 optionally includes a data payload 420 that is transmitted to base station 20. In one application, data payload 420 includes the serial number of the field unit 14 transmitting message 410. Typically, some form of redundancy check information such as CRC data is included with message 410 so that base station 20 can determine whether message 410 is properly received without errors.

If message 410 is received without errors, base station 20 can respond accordingly to establish a link with a field unit 14 and transmit a "non-collision" message on feedback channel 45 to the field units 14. Alternatively, if message 410 includes an error free preamble 415 but improperly received data payload information 420, base station 20 can deduce that two or more transmitters sent a message at the same time. A collision detection message is then transmitted over feedback channel 45 indicating that a collision occurred. Thus, a target receiver such as base station 20 monitoring messages 410 can provide valuable feedback to multiple transmitting field units 14 whether a message collision occurs.

Another aspect of the present invention involves coding a preamble 415 using pilot block 53 and Barker code block 54. Based on this coding or use of a sequence of symbols, a field unit 14 can transmit a message 410 to base station 20.

As shown, a preamble message 415 can include four pilot blocks 53 and four Barker code blocks 54. The Barker code blocks 54 assist base station 20 identify a point where preamble 415 of a message 410 starts. In other words, the information in the preamble 415 can be used for timing purposes at the base station 20 to asynchronously receive a message. Thus, it is not necessary that a field unit 14 transmit a message 410 in a time slot 210 because base station 20 can be modified to receive asynchronous messages.

However, in an application where messages 410 include Barker code blocks 54 that are transmitted in a time slot 210, base station 20 can identify a received message 410 even if a collision occurs because the preamble 415 of a message 410 simultaneously transmitted by multiple field units 14 in a time slot will overlap and, thus, will be detectable at base station 20.

Each pilot block 53 includes a number of repeating pilot symbols. Preferably, a pilot block includes 48 symbols that are used by a target receiver to decode message 410.

The second portion of a message 410 can include a data payload 420 that is sent to base station 20. Preferably, pilot symbols are also inserted in the data payload 420 portion of message 410 for assisting in coherent demodulation of data at a target receiver. Pilot symbols typically include a series of positive data bits and therefore do not themselves inherently include timing information.

A Barker code block 54 as shown includes a predetermined pattern of bit information. Use of BPSK (Binary Phase Shift Keying) can be used to generate a positive barker sequence 450, +B, such as three positive bits, followed by three negative bits, a positive bit, a pair of negative bits, a positive bit and then a negative bit respectively. A Barker code sequence can alternatively be negative such as a negative Barker sequence, −B, further assisting in message processing at a monitoring device. Further details for processing message 410 including pilot blocks 53 and Barker code blocks 54 can be found in co-pending U.S. patent application Ser. No. 09/766,875 filed on Jan. 19, 2001 entitled "Access Channel Structure for Wireless Communication System," the entire teachings of which are incorporated herein by reference.

Figure 5:
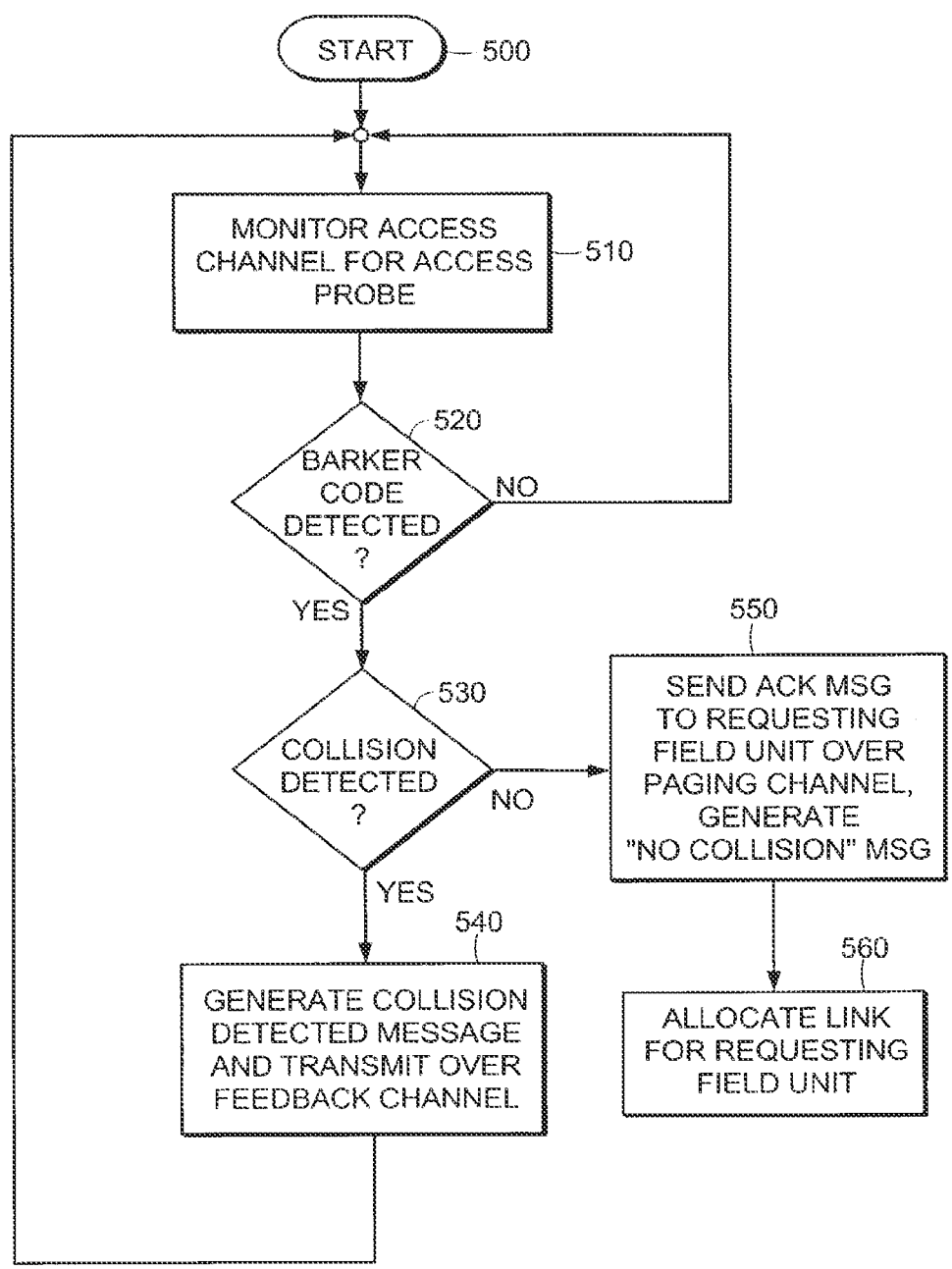
FIG. 5 is a flow chart for processing messages at a target receiver according to certain principles of the present invention.

FIG. 5 is a flow chart illustrating a process for monitoring a channel for messages according to the principles of the present invention.

Step 500 generally indicates an entry point into the flow chart. In step 510, an access channel 51 is monitored for message transmissions such as access request messages transmitted by a field unit 14. It is then determined in step 520 whether the message includes a Barker code or an appropriately received preamble 415 of a message 410. If no Barker code or preamble 415 is detected in step 520, process flow resumes at step 510 again. Alternatively, if a Barker code is detected in step 520, the message 410 is further analyzed to determine if a collision occurs in a time slot. That is, it is determined whether at least a portion of data in a received message 410 is corrupted.

One way to determine if a message collision occurs is to verify that data in a message 410 was properly received. This can be achieved by analyzing the received message 410 according to redundancy check information. If the data in a message 410 is not properly received at base station 20, a feedback message is transmitted by base station 20 over feedback channel 45 indicating that a collision was detected for a previous access request message in step 540. Following step 540, process flow resumes again at step 510.

If a collision is not detected for a particular message in step 530, the message 410 is analyzed to determine which of multiple field units 14 sent the message. Following in step 550, an ACK message 240 is sent to the requesting field unit 14 over the paging channel 41. Also, a message is sent over the feedback channel 45 indicating that no message collision occurred for the corresponding previous time slot 210 of access channel 51. Finally, a more formal link is established with the access requesting field unit in step 560.

Figure 6:
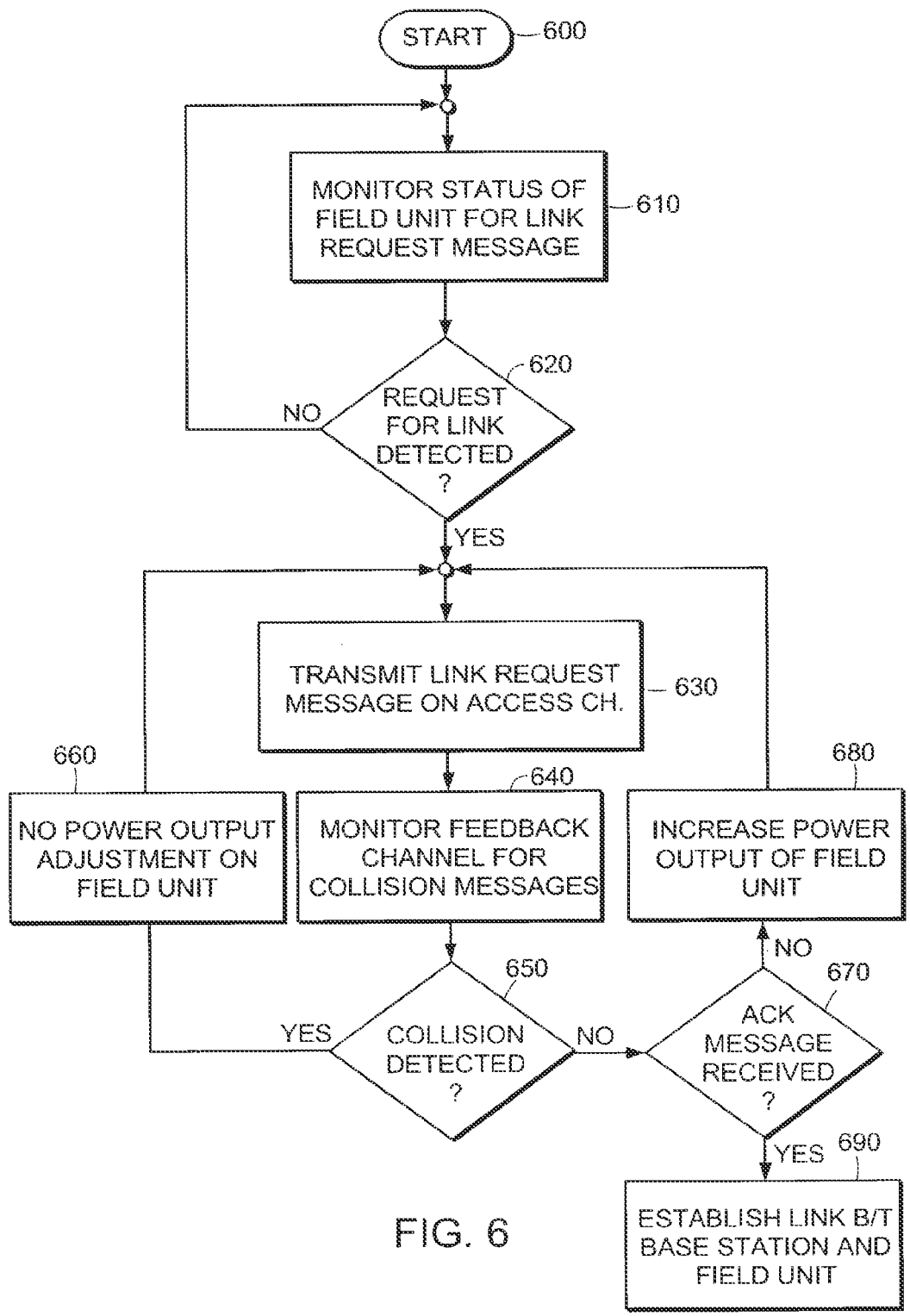
FIG. 6 is a flow chart for transmitting messages to a target receiver according to certain principles of the present invention.

FIG. 6 is a flow chart illustrating a process flow at a field unit for transmitting a message to a target receiver according to the principles of the present invention. Step 600 generally indicates an entry point into the flow chart.

In step 620, the status of field unit 14 is monitored for an input by a user indicating that the field unit 14 desires to establish a communication link with a target receiver such as base station 20. It is then determined in step 620 whether the input indicates that a field unit 14 desires to establish a communication link. If not, process flow again resumes at step 610. If so, field unit 14 transmits an access request message on the access channel 51 in step 630. Thereafter, the feedback channel 45 is monitored by a field unit 14 in step 640 for feedback information such as collision detection messages.

If a collision is detected for a previous transmission by a field unit 14 in step 650, process flow continues at step 660 where the power output level is not adjusted for the field unit 14 and a message 410 is subsequently re-transmitted in step 630. If a collision is not detected in step 650 as indicated by a collision feedback message, it is determined in step 670 whether an ACK message 240 is received at the field unit 14 over paging channel 41. If so, a link is established between the field unit 14 and base station 20 in step 690. If not, the power output level of the field unit 14 is increased in step 680 and process flow continues at step 630 to re-transmit a message from the field unit 14 to base station 20.

Figure 7:
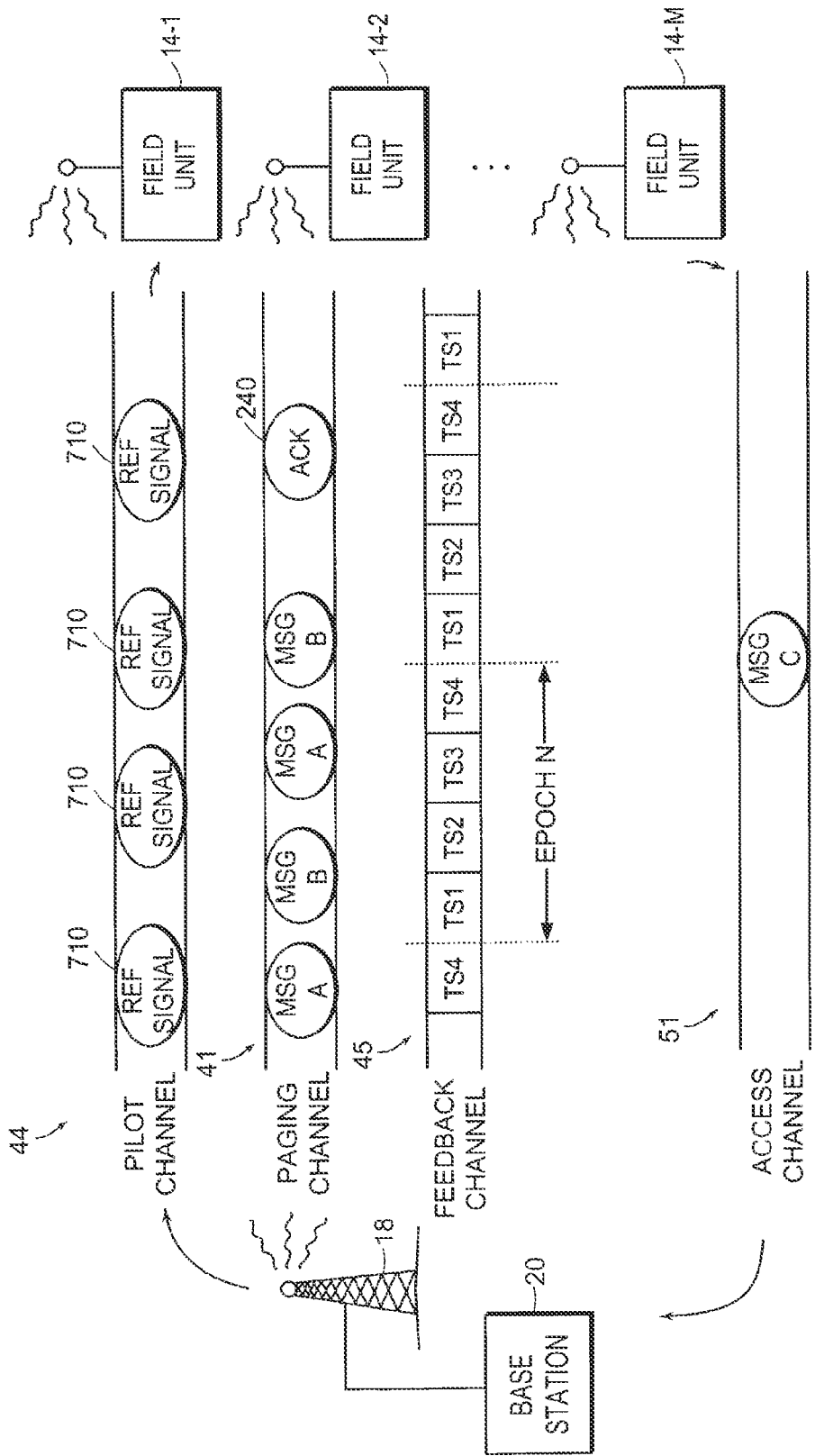
FIG. 7 is a timing diagram illustrating multiple channels on which messages are transmitted according to certain principles of the present invention.

FIG. 7 is a timing diagram illustrating multiple channels on which messages are transmitted among transceivers according to the principles of the present invention.

As previously discussed, one aspect of the present invention involves setting a field unit 14 to an initial power level so that it minimally interferes with other users during a message transmission. Since power is ramped up based on whether an access message is detected at base station 20, it is preferable that the initial power level of the field unit is reasonably near a power level at which base station 20 will receive a message at a desired power level. Consequently, a field unit 14 will be able to transmit a message to base station 20 and establish a more formal communication link in less time since a power level output of field unit 14 will need only minimal adjustments so that a message is received at base station 20.

One method for initially setting a power output level of a field unit 14 involves transmitting a reference signal 710 on pilot channel 44 from base station 20. Preferably, the reference signal 710 is transmitted at an appropriate power level so that multiple field units 14 in a wireless airspace monitoring the pilot channel 44 can identify the reference signal 710 and measure a power level at which it is received. In one application, reference signal includes pilot information such as a sequence of pilot symbols, where the pilot symbols are defined by PN (Pseudo Noise) codes. One or multiple pilot correlation filters in field unit 14 is used to detect the pilot symbols.

Each field unit 14 monitoring the pilot channel 44 typically includes a power detector circuit to measure a power level, of the received reference signal 710. For example, the power detector is used to measure the strongest pilot path of the received reference signal 710. This measurement is used to estimate a forward path loss between base station 20 and field unit 14.

The total received signal power level of the reference signal 710 can be computed based on the sum of the magnitude squared of the I and Q channel. Power measurements are optionally filtered for providing a better estimate of a received power level under fading conditions.

As shown in FIG. 7, messages are transmitted on paging channel 41 from base station 20 to field units 14. One such message is message A that includes information indicating a power level at which reference signal 710 is transmitted from base station 20. This value can be expressed in dBm that already takes into account the gain of the base station antenna. Thus, message A can include effective radiated power level information at which base station 20 transmits reference signal 710. In harmony with the principles of the present invention, additional messages such as antenna gain information, offset information, correction information and general information can be transmitted to a field unit 14.

Field unit 14 decodes message A to determine a power level, at which reference signal 710 is transmitted. The forward path loss between base station 20 and field unit 14 is then determined by comparing the received power level of the reference signal 710 at field unit 14 with the effective radiated power level as indicated by message A.

The calculated forward path loss can then be used to estimate a reverse path loss between field unit 14 and base station 20. For example, the reverse path loss is estimated to be about the same as the forward path loss, although it is probably at least slightly different. This estimated path loss is used to determine an initial setpoint at which messages can be transmitted from field unit 14 to base station 20.

Consider a case where base station 20 transmits a reference signal 710 at an effective radiated power level of 55 dBm. As discussed, this information is sent to field units 14 via message A generally broadcasted on the paging channel 41. if the received power level of the reference signal 710 is 22 dBm, the forward path loss is calculated as 55−22 dBm, or forward path loss=33 dBm. Based on this path loss, a field unit 14 can estimate a reasonable power output level for a subsequent attempt to transmit a message to base station 20.

Additional messages can be sent on paging channel 41 from base station 20 to field units 14. For example, message B is also generally transmitted to field units over paging channel 41. Message B preferably includes encoded information indicating a desired power level at which base station 20 will receive subsequent messages from a field unit 14. This information can also be a specific message directed transmitted to a particular field unit 14. Thus, a field unit 14 can use the information to estimate at what level a message should be transmitted so that a message is received at the desired power level. In a case where message B indicates a desired power level of 12 dBm and the forward path loss is approximately 33 dB as discussed, field unit 14 can attempt to transmit a message at 33+12 dBm, or 45 dBm, to base station 20.

Notably, the reverse path loss may be much more than 33 dBm as estimated. In such a situation, base station would not necessarily detect a message transmitted by field unit 14. As previously discussed, however, the power output setpoint of 45 dBm can be a starting point at which messages such as access request messages 750 are transmitted over access channel 51. If a collision is not detected at base station 20 and no ACK message 240 is received over paging channel 41, the power output of field unit 14 can be increased by 1 dBm to 46 dBm for a subsequent attempt to transmit a message. This procedure of adjusting the power output level of a field unit 14 can be repeated until a message is detected at base station 20.

Figure 8:
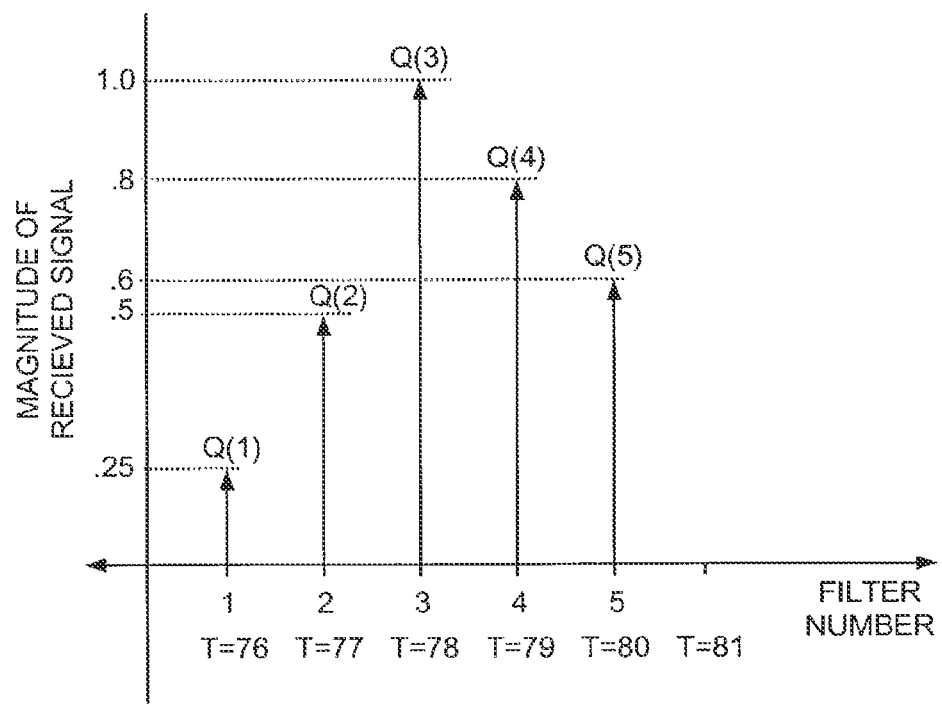
FIG. 8 is a diagram of a monitored reference signal according to certain principles of the present invention.

Messages transmitted to base station 20 can also be monitored to determine a power level at which a message is received from a field unit 14. To achieve this end, a message such as message C can include pilot information such as a pilot symbol or sequence of pilot symbols. Pilot correlation filters are then used to identify the strongest diversity path and side paths as shown in FIG. 8. One or multiple paths are then used to determine a power level at which the message is received at base station 20 on access channel 51. To ensure that a message C is properly received, the message is analyzed for errors using error detection information such as CRC check bits. These and other aspects of invention were previously discussed in this specification.

After message C is properly received at base station 20, a power adjustment message is generated at base station 20 to indicate how the field unit 14 should be adjusted so that subsequent messages to base station 20 are received at a desired power level, For example, if base station 20 determines that a message is received at 23 dBm, base station 20 can send a message over paging channel 41 indicating that the field unit should reduce its power output level for subsequent message transmissions so that a message from a field unit is received at a lower power level such as 12 dBm.

FIG. 8 is a graph illustrating a received diversity string for a pilot symbol according to the principles of the present invention. A received message such as reference signal 710, message A, message B or message C can include a marker such as one or multiple pilot symbols that are monitored at a receiver to determine a power level of a received message.

Both base station 20 and field units 14 include pilot correlation filters for identifying a marker such as one or multiple pilot symbols in a transmitted message. This marker aids in analyzing both timing alignment and a received power level of a message. Incidentally, the diversity string illustrates the receipt of a marker in a message as a result of multipath fading. That is, a signal from a transmitter is received at a target at different times due to varying times it takes for the signal to reach the target over different paths between a transmitter and receiver.

Preferably, the strongest received diversity path will be designated as the time alignment string at base station 20 field unit 14 for analyzing the timing of a received message. Likewise, the single strongest path is preferably chosen to calculate a power level at which a message is received. However, additional paths are optionally used to determine a received, power level of a message.

Timing alignment and a received power level of a message is determined using the correlation profile of the strongest pilot in a particular string, which is analyzed as mentioned using correlation filters. The output of the correlation filters typically consist of 256 samples, which represent 64 lags at 4 samples per lag. The 256 sample output-window represents the total correlation time span of a receiver device. This can vary depending on the application. Preferably, the time alignment point is sample number 80 which allows 20 lags for precursor and 44 lags for post cursor channel information.

Generally, the computation of the time alignment error is based on a determination of where the centroid or peak lies in a given sample string. For example, each field unit 14 transmitting in a time slot includes a marker, i.e., the peak signal, located at a predetermined position within a time slot. The strongest pilot path for the channel and 2 samples on either side of the main path, i.e., 1 and ¼ chips, is statistically analyzed to determine the centroid or peak of a marker within a time slot. Location of the centroid, L, of the samples in FIG. 6 is calculated based on the following equation:

$$L = \frac{\sum [t \times Q(+)]}{\sum Q(t)}$$

where t=sample time and Q(t) is the magnitude of a sample at a given time. For example, L is calculated based on the results as shown in FIG. 6:

$$L = \frac{(.25*76) + (.5*77) + (1.0*78) + (.8*79) + (.6*80)}{.25 + .5 + 1.0 + .8 + .6}$$

$$L = 78.317$$

Again, the timing alignment error is determined by comparing the timing of the computed centroid to the desired time set point of 80, which is chosen as the reference point for timing alignment within a time slot. Since the centroid in the example above is estimated to be 78.317, timing is early relative to the set point of 80. An appropriate message can be sent to field unit 14 indicating how its timing should be finely tuned so that messages from field unit 14 are received at the appropriate time at base station 20. In a similar manner, the diversity string of FIG. 8 can be analyzed to determine a power level at which a message is received. Thus, an appropriate message can be sent to field unit 14 indicating how its power output level should be adjusted so that a message is received at a desired power level.

As mentioned, this technique can be used to detect a received power level of reference signal 710 at base station 20.

More details regarding timing alignment and power control between a base station 20 and each of multiple field units 14 can be found in co-pending U.S. Application No. 09/778,474 entitled "Minimal Maintenance Link to Support Synchronization" filed on Feb. 7, 2001, and co-pending U.S. application Ser. No. 09/775,305 entitled "Maintenance Link Using Active/Standby Request Channels" filed on Feb. 1, 2001, the entire teachings of both of which are incorporated herein by reference.

Figure 9:
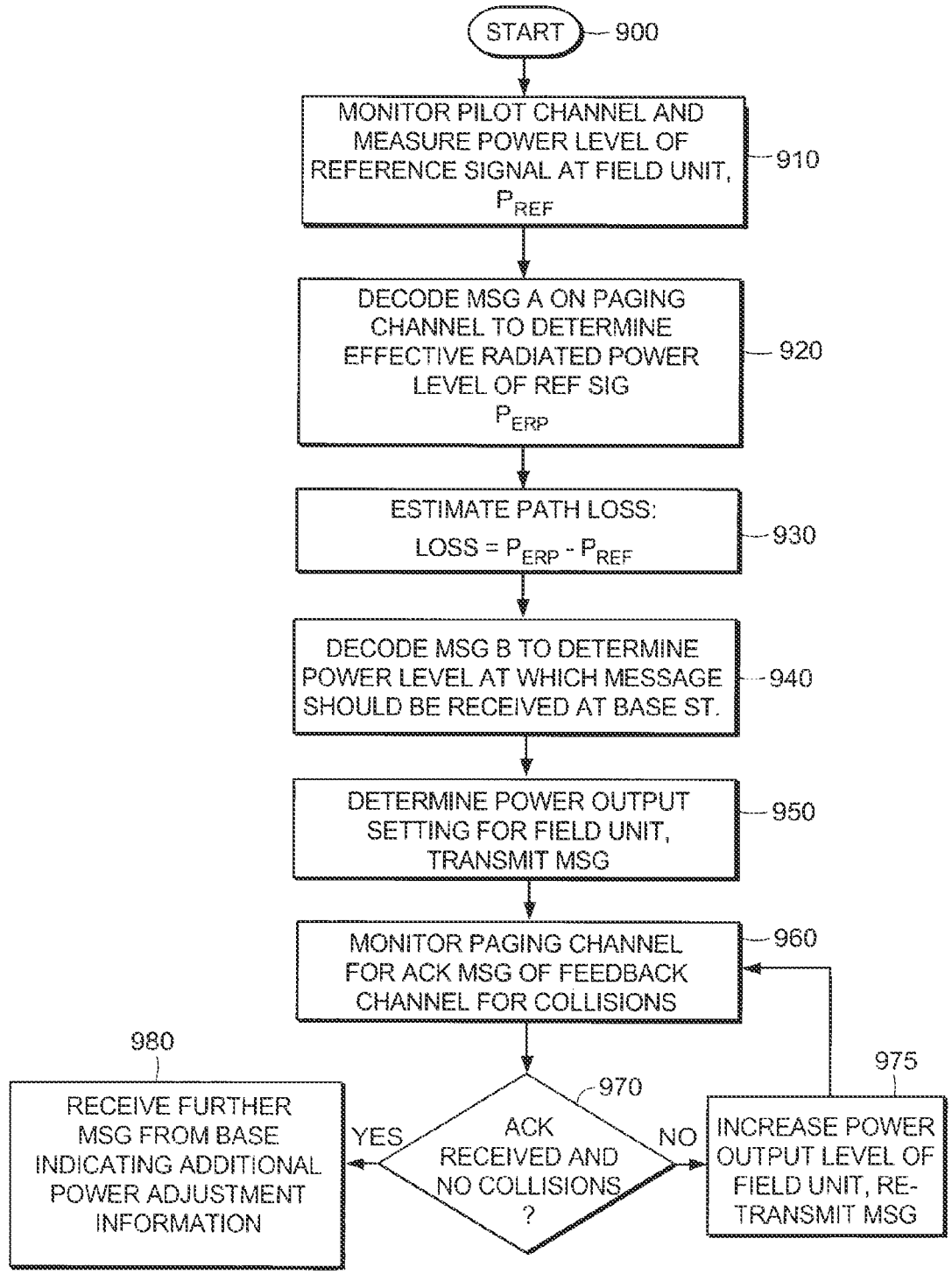
FIG. 9 is a flow chart for setting an initial power output level of a transmitter device according to certain principles of the present invention.

FIG. 9 is a flow chart illustrating a method for setting a power level output of a field unit based on an estimated path loss according to the principles of the present invention.

Step 900 indicates an entry point into the flow chart. Following in step 910, field unit 14 monitors pilot channel 44 for reference signals 710. As previously discussed, the field unit determines a power level at which reference signals 710 are received using a power detector circuit and pilot correlation filters.

In step 920, paging channel 41 is monitored by a field unit 14 for messages transmitted from base station 20. As previously discussed, message A is received on paging channel 41 and decoded to determine an effective radiated power level at which reference signals 710 are being transmitted from base station 20.

Based on the detected power level of reference signal 710 as received at field unit 14 and corresponding effective radiated power level at which the reference signal 710 is transmitted from base station 20, a path loss is estimated between the base station and field unit 14 in step 930. Preferably, the path loss is estimated by computing the difference between the power level at which reference signal 710 is transmitted from base station 20 and a power level at which reference signal 710 is received at field unit 14.

Message B is subsequently received at field unit 14 in step 940. This message preferably includes information indicating a desired power level at which messages are to be received at base station 20.

Based on the desired power level at which messages are to be received at base station 20 and the estimated path loss in step 930, field unit 14 determines a power output setting for field unit 14 so that a message is received at the desired power level at base station 20 in step 950. More specifically, it is presumed that an actual path loss from the field unit 14 to base station is approximately the same as the calculated path loss between the base station and field unit 14 based on measurements of reference signal 710. Thus, an appropriate power output level of field unit 14 can be determined by adding the estimated path loss to the desired power level setting to determine a power output setting for field unit 14. Consequently, this power output setting of a field unit 14 should be a reasonable starting point for attempting to transmit an initial message to base station 20.

Also in step 950, field unit 14 transmits message C such as an access request message to base station 20 over access channel 51. Upon receipt, base station 20 measures a received power level of message C at base station 20. This received power level is then compared to the desired power level so that feedback can be provided to field unit 14 indicating how to adjust its power output level so that subsequent messages are received at the desired power level.

Following in step 960, field unit 14 monitors paging channel 41 for an ACK message indicating that base station 20 properly received message C. If an ACK is not received in step 970, the power output level of a field unit 14 is increased in step 975 and the message is subsequently re-transmitted in step 960. This loop of increasing power generally repeats until base station 20 acknowledges receipt of the message.

When an ACK is received in step 970, process flow continues at step 980 in which additional messages are received from base station 20 indicating whether the message transmitted in step 950 was received at the desired power level. As discussed, information can be transmitted to a field unit 14 indicating how to adjust its power output level so that subsequent messages are received at the desired power level at base station 20. Consequently, the output power level of the field unit 14 is adjusted accordingly for subsequent message transmissions.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for use in a subscriber unit for performing an access procedure, the method comprising:
    transmitting a first signal to a base station wherein the first signal is associated with requesting access to a network associated with the base station;
    monitoring, in response to transmission of the first signal, for a first message from the base station, wherein the first message includes timing and power adjustment information for transmitting an access request message to the base station over an uplink shared channel;
    transmitting the access request message to the base station over the uplink shared channel in accordance with the timing and power adjustment information, wherein the access request message indicates a request to establish a communication connection and includes identification information associated with the subscriber unit; and
    receiving a second message from the base station in response to the access request message, wherein the second message indicates the identification information associated with the subscriber unit to resolve a potential collision.

2. The method of claim 1, further comprising:
    retransmitting the first signal on a condition that processing of the second message indicates the access request message was not correctly received by the base station.

3. The method of claim 1, wherein a communication connection is established on a condition that processing of the second message indicates the access request message was correctly received by the base station.

4. The method of claim 3, wherein the established communication connection is a bidirectional traffic communication link.

5. The method of claim 1, further comprising:
    transmitting a second signal on the uplink shared channel, wherein a first part of the second signal has pilot symbols and a second part of the second signal has every other symbol a pilot symbol.

6. The method of claim 1, wherein the second message is an indication of non-collision of the access request message from the subscriber unit.

7. A subscriber unit for performing an access procedure comprising:
    a transmitter configured to transmit a first signal to a base station wherein the first signal is associated with requesting access to a network associated with the base station;
    a receiver configured, in response to transmission of the first signal, to monitor for a first message from the base station, wherein the first message includes timing and power adjustment information for transmitting an access request message to the base station over an uplink shared channel;
    the transmitter further configured to transmit the access request message to the base station over the uplink shared channel in accordance with the timing and power adjustment information, wherein the access request message indicates a request to establish a communication connection and includes identification information associated with the subscriber unit; and
    the receiver further configured to receive a second message from the base station in response to the access request message, wherein the second message indicates the identification information associated with the subscriber unit to resolve a potential collision.

8. The subscriber unit of claim 7, wherein the transmitter is further configured to retransmit the first signal on a condition that processing of the second message indicates the access request message was not correctly received by the base station.

9. The subscriber unit of claim 7, wherein a communication connection is established on a condition that processing of the second message indicates the access request message was correctly received by the base station.

10. The subscriber unit of claim 9, wherein the established communication connection is a bidirectional traffic communication link.

11. The subscriber unit of claim 7, further comprising:
    the transmitter is further configured to transmit a second signal on the uplink shared channel, wherein a first part of the second signal has pilot symbols and a second part of the second signal has every other symbol a pilot symbol.

12. The subscriber unit of claim 7, wherein the second message is an indication of non-collision of the access request message from the subscriber unit.

13. A base station in a network comprising:
    a receiver configured to receive a first signal from a subscriber unit wherein the first signal is associated with an access procedure;
    a transmitter configured to transmit a first message to the subscriber unit in response to receiving the first signal from the subscriber unit, wherein the first message includes timing and power adjustment information for transmitting an access request message to the base station over an uplink shared channel;
    the receiver further configured to receive the access request message from the subscriber unit over the uplink shared channel in accordance with the timing and power adjustment information, wherein the access request message indicates a request to establish a communication connection and includes identification information associated with the subscriber unit; and
    the transmitter further configured to transmit a second message to the subscriber unit in response to the access request message, wherein the second message indicates the identification information associated with the subscriber unit to resolve a potential collision.

14. The base station of claim 13, wherein the receiver is further configured to decode the access request message, wherein the access request message includes encoded information.

15. The base station of claim 13, wherein the access procedure is a random access procedure.

16. The base station of claim 13, further comprising:
the receiver is further configured to receive a second signal on the uplink shared channel, wherein a first part of the second signal has pilot symbols and a second part of the second signal has every other symbol a pilot symbol.

17. The base station of claim 13, wherein the second message is an indication of non-collision of the access request message from the subscriber unit.

\* \* \* \* \*